United States Patent [19]
Schwind et al.

[11] Patent Number: 4,762,450
[45] Date of Patent: Aug. 9, 1988

[54] DAMAGE RESISTANT PLASTIC EXPANSION NUT AND SCREW THEREFOR

[75] Inventors: Richard J. Schwind, Akron, Ohio; Joseph Bart, St. Charles; Burnell Wollar, Barrington, both of Ill.

[73] Assignee: Phillips Plastics Corp., Phillips, Wis.

[21] Appl. No.: 825,651

[22] Filed: Feb. 3, 1986

[51] Int. Cl.[4] .................. F16B 13/04; F16B 37/16
[52] U.S. Cl. .................... 411/34; 411/187; 411/310; 411/437; 411/908; 411/544
[58] Field of Search ............ 411/34, 35, 36, 37, 411/38, 411, 417, 59, 184, 185, 186, 187, 437, 423, 436, 310, 311, 43, 41, 55, 512, 544, 908

[56] References Cited

U.S. PATENT DOCUMENTS

| Re. 27,678 | 6/1973 | Orlomoski | 411/311 |
|---|---|---|---|
| 986,510 | 3/1911 | Scott | 411/186 |
| 1,872,166 | 8/1932 | Muhlig | 411/423 |
| 2,148,977 | 2/1939 | Buck | 411/38 |
| 2,389,278 | 11/1945 | Simmons | 411/437 |
| 2,409,352 | 10/1946 | Gill | 411/38 |
| 2,461,397 | 2/1949 | Ross | 411/436 X |
| 2,484,644 | 10/1949 | Poupitch | 411/311 |
| 2,487,296 | 11/1949 | Bergstrom | 411/411 X |
| 2,562,032 | 7/1951 | Gutensohn | 411/188 X |
| 2,670,021 | 2/1954 | Torresen | 411/34 |
| 2,762,252 | 9/1956 | Karitzky | 411/38 |
| 2,833,326 | 5/1958 | Knohl | 411/185 |
| 3,174,387 | 3/1965 | Fischer | 411/37 |
| 3,255,797 | 6/1966 | Attwood | 411/188 |
| 3,365,999 | 1/1968 | Perlin | 411/34 |
| 3,385,156 | 5/1968 | Polos | 411/37 |
| 3,438,417 | 4/1969 | Albris | 411/185 |
| 3,937,122 | 2/1976 | Riedel | 411/34 |
| 4,571,136 | 2/1986 | Peek | 411/512 |

FOREIGN PATENT DOCUMENTS

| 159972 | 11/1954 | Australia | 411/437 |
|---|---|---|---|
| 822010 | 11/1951 | Fed. Rep. of Germany | 411/38 |
| 828463 | 1/1952 | Fed. Rep. of Germany | 411/437 |
| 1042192 | 6/1953 | France | 411/411 |

Primary Examiner—Neill Wilson
Attorney, Agent, or Firm—James E. Nilles; Thomas F. Kirby

[57] ABSTRACT

A molded plastic one-piece hollow expansion nut comprises an outwardly expandable shank which is insertable through a panel hole and a head at one end of the shank for engaging the panel surface. A screw-receiving bore extends axially through the nut and receives the threaded shank of a screw whose screw head bears against the nut head. The portion of the bore along which shank wall expansion occurs is cylindrical and of slightly larger diameter than the screw thread. The inmost end of the bore is of oblong cross-section and its minor axis is shorter than the diameter of the screw thread. A single screw-engaging thread in the cylindrical bore initially holds and guides the screw. The shank walls opposite the ends of the minor axis have oblique screw-thread receiving slots therethrough which define very sturdy damage resistant nut threads which engage the screw thread. Rotational insertion of the screw draws the insertion end of the nut shank toward the nut head and effects shank expansion to thereby secure the nut in the panel hole. In some embodiments, interengageable components on the nut and on the screw interengage to prevent further screw rotation after the nut reaches fully expanded condition. In some embodiments, ratchet teeth on the screw thread and nut slots engage to prevent screw removal.

8 Claims, 4 Drawing Sheets

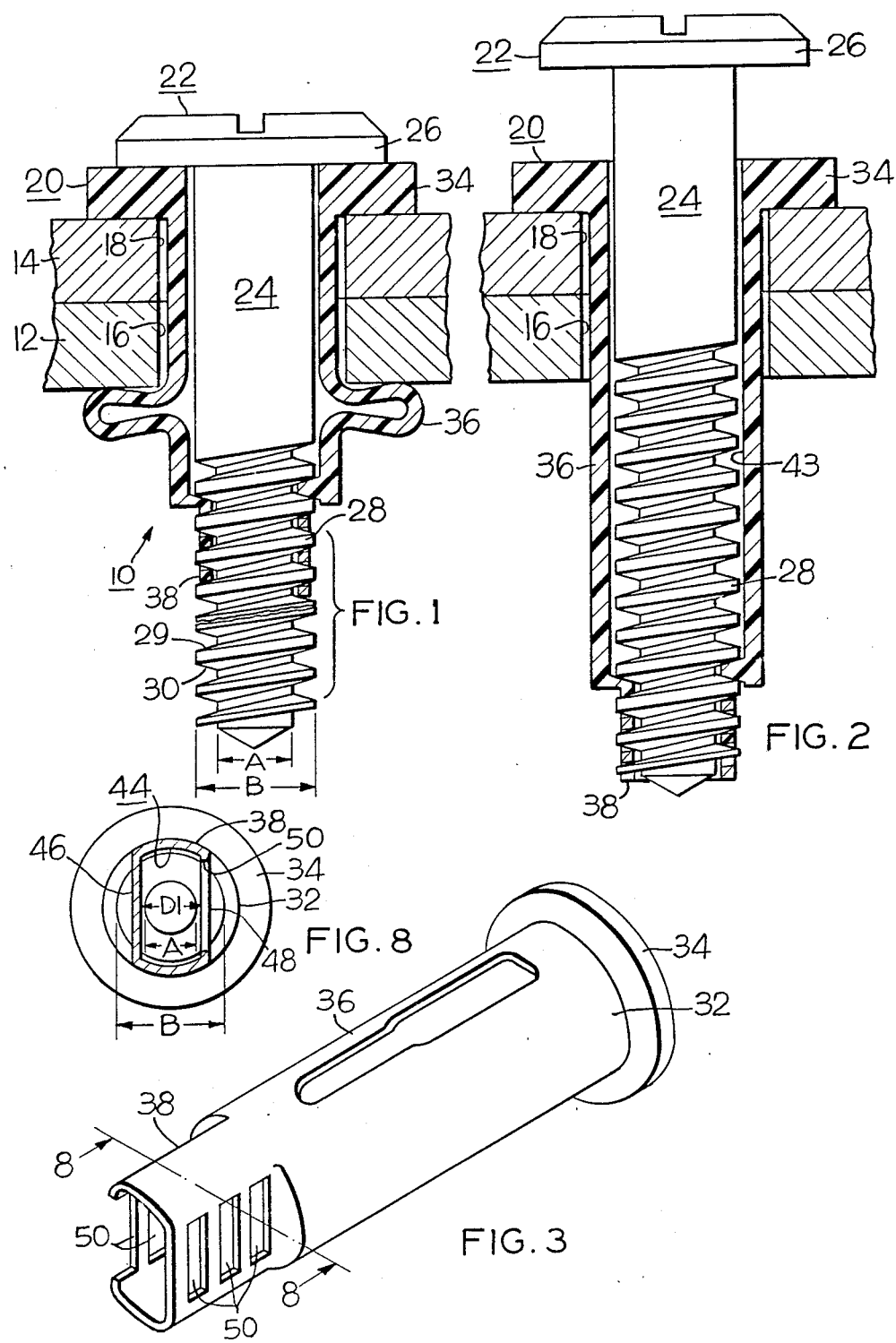

DAMAGE RESISTANT PLASTIC EXPANSION NUT AND SCREW THEREFOR

SUMMARY OF THE INVENTION

1. Field of Use

This invention relates generally to a fastener comprising a one-piece molded plastic hollow expansion nut and a molded plastic screw therefor. In particular, it relates to improved damage resistant structural features embodied in said nut and screw.

2. Description of the Prior Art

Prior art one-piece molded plastic hollow expansion nuts take various forms and are advantageously used, as in the automotive and domestic appliance industries, with a screw to connect two metal or plastic panels together in face-to-face relationship, although such nuts have other uses.

One type of such a prior art nut generally comprises an outwardly expandable nut shank insertable through aligned holes in the panels, a nut head at one end of the nut shank for engaging the outer surface of one of the panels, and a screw-receiving bore extending through the nut head and nut shank and internally threaded near the insertion end of the nut shank (i.e., the end farthest from the nut head) for engaging the threaded end of the shank of a screw inserted into the bore. Rotation of the screw while the screw head engages the nut head draws the insertion end of the nut shank toward the nut head and effects outward expansion of the walls of the nut shank thereby entrapping the panels between the nut head and the expanded walls of the nut.

Typically, the screw is rotatably driven into the nut by a power tool, such as a hand-held power screwdriver or power wrench. However, if the screw is metal and if rotation is continued after the nut has been fully expanded, the plastic nut will fail because the torque force applied through the screw to the plastic nut causes the metal screw thread to abrade or tear out the plastic threads in the nut bore or, if the plastic threads hold, causes twisting damage to the expanded nut shank (called "rosetting"). Such over-driving of the screw can come about accidentally, or because of inattention, inexperience or lack of training on the part of the tool operator. In some types of prior art fasteners, wherein the screw head is not initially in contact with the nut head, a sharp increase in torque occurs when the rotating screw head frictionally engages the nut head. This torque increase can be felt by the tool operator and warns the operator that full nut expansion is imminent and enables him to employ appropriate installation techniques, such as slowing-down or backing-off the power tool. However, where the screw head is initially engaged with the nut head, no sharp, distinctive, obvious torque increase occurs to warn the operator and the operator needs to be trained to employ other techniques to ensure proper installation and avoid failure of the expansion nut.

SUMMARY OF THE PRESENT INVENTION

In accordance with the present invention, there is provided an improved fastener which comprises a one-piece molded plastic hollow expansion nut and a screw therefor. The fastener is well-adapted to secure two or more panels together or to secure some sort of member to a single panel. The nut is insertable into a hole in the panel(s) wherein it expands upon screw insertion. The fastener is designed and constructed to accomplish three objectives, namely: to indicate to the installer that full expansion of the nut is imminent, to resist or prevent damage to the nut in the event that overtorqing does occur, and, in one embodiment, to positively prevent overtorqing from occurring.

The screw generally comprises a screw shank, a screw head at one (head) end of the screw shank, and a helical screw thread on the screw shank, at least near the other (insertion) end of the screw shank. The screw thread has a constant outside diameter and, preferably, a constant root diameter, and also has upper and lower thread surfaces defining screw thread thickness. In one embodiment disclosed herein, screw thread thickness increases (proceeding from the insertion end toward the head end) to create ever-increasing frictional engagement with the nut as the screw is inserted to thereby inhibit overtorqing. Preferably, the screw is made of molded plastic but it could be metal. In another embodiment of the invention disclosed herein, the screw head is conical in shape and the conical surface is provided with locking recesses which engage corresponding projections on a head of the nut to stop screw rotation and prevent overtorqing, as hereinafter explained.

The expansion nut for receiving the screw comprises, in its broadest aspect, a nut shank having an expandable portion therealong and outwardly extending panel-engaging flange means in the form of a nut head near one (head) end of the nut shank. The nut shank has a screw-receiving bore extending axially therethrough. The bore includes a first bore portion (preferably cylindrical) extending axially through the expandable portion of the nut shank and through the head and is adapted to receive the threaded screw shank therein in sliding (non-thread engaging) relationship. The bore also includes a second bore portion near the other (insertion) end of the nut shank which is defined by, or at least bounded by, opposite spaced apart bore wall portions of the nut shank. The second bore portion has a non-circular cross-sectional configuration (preferably oblong) and the length of its minor axis is greater than the root diameter but less than the outer diameter of the screw thread. Each bore wall portion has at least one, but preferably several, oblique screw thread receiving slots therein for receiving the screw thread of the screw in the threaded relationship. To simplify mold construction it is preferable that the slots extend entirely through the bore wall portions.

In operation, rotation of the screw while the screw head engages a part of the nut (preferably the nut head) and with the screw thread engaged in the slots, effects axial movement of the insertion end of the nut shank toward the nut head and outward expansion of the expandable portion of the nut shank. If the nut is installed in a panel hole, the panel is then gripped between the nut head and the expanded portion of the nut shank.

In a preferred embodiment disclosed herein, the nut includes screw-guide thread means projecting outwardly from the bore wall at the innermost end of the first bore portion, in the form of a single thread, which is engageable with the threaded screw shank to help guide the screw thread into the slots.

Another embodiment also includes screw-engaging means for inhibiting screw rotation when the screw shank is at a predetermined axial position in the second bore portion (i.e., engaged with all the slots) and the nut is fully expanded. Such screw-engaging means comprise screw-support means which are engageable with the screw head and which are resiliently movable (or collapsible) thereby in response to predetermined force applied thereto by the screw head. The screw-support means moves to a displaced position wherein it is out-of-the-way and enables further rotation and slight axial advancement of the screw head to a position wherein interengaging lock means on the nut head and on the screw head can lockingly engage to prevent further screw rotation.

In still another embodiment of the invention, ratchet teeth are formed in the lower edge surfaces of the slots for engagement with corresponding ratchet teeth formed on the underside of the screw thread to effect, depending on tooth direction, either maximum stripping resistance or prevention of withdrawal of the screw from the nut.

DRAWINGS

FIG. 1 is a side elevation view, partly in cross-section, showing two panels secured together by a fully installed fastener in accordance with the invention, such fastener comprising a one-piece molded plastic hollow expansion nut and a one-piece molded plastic screw;

FIG. 2 is a view similar to FIG. 1 but showing the nut inserted in aligned panel holes but unexpanded and showing the screw partially inserted in the nut but prior to full insertion;

FIG. 3 is a perspective [isometric] view of the nut taken from the insertion end thereof;

FIG. 8 is a greatly enlarged cross-section view of the nut taken on line 8—8 of FIG. 3;

DESCRIPTION OF PREFERRED EMBODIMENTS

Figure 6:
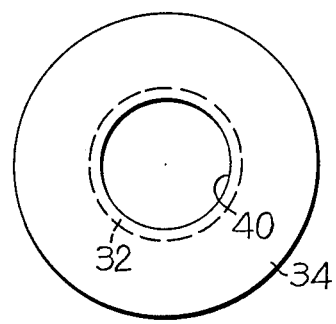
FIG. 6 is a top plan view of the head end of the nut.
Figure 4:
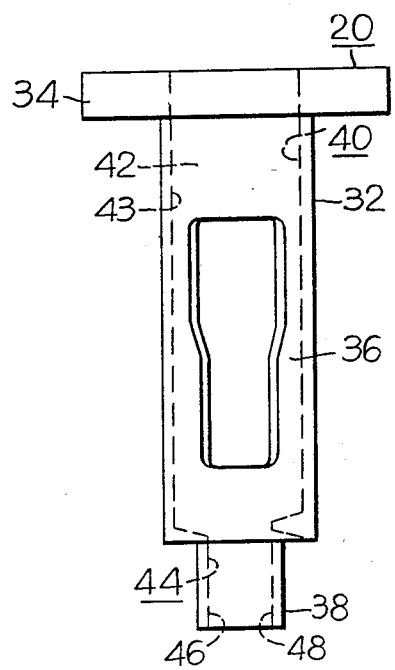
FIG. 4 is an elevation view of one side of the nut.
Figure 5:
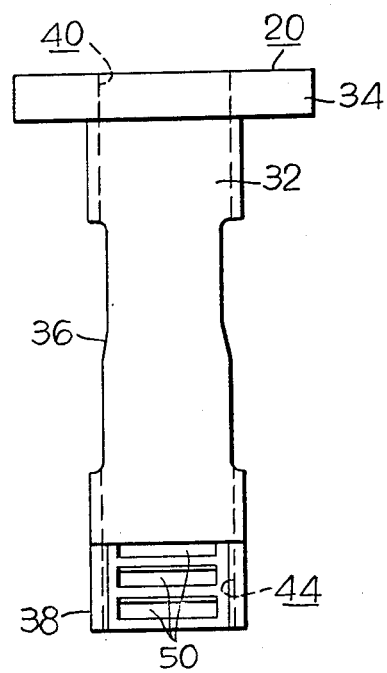
FIG. 5 is an elevation view of another side of the nut.
Figure 7:
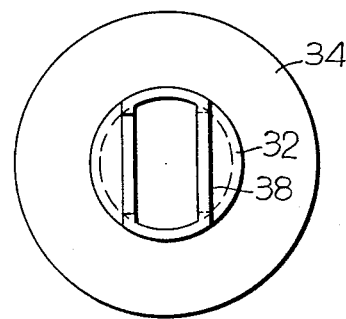
FIG. 7 is a bottom plan view of the insertion end of the nut.

Referring to FIG. 1, numeral 10 designates a fastener in accordance with the invention which is shown in fully installed condition to secure together two panels 12 and 14 which have aligned circular holes 16 and 18, respectively, therethrough. Fastener 10 comprises a molded plastic one-piece hollow expansion nut 20 and a molded plastic one-piece screw 22 for insertion into the nut to effect expansion thereof. FIG. 1 shows screw 22 fully inserted in nut 20 which is installed in the aligned panel holes 16 and 18 and is fully expanded. FIG. 2 shows unexpanded nut 20 inserted into the aligned panel holes 16 and 18 and shows screw 22 just prior to its full insertion into nut 20.

As FIGS. 1 and 2 show, screw 22 comprises a screw shank 24, a screw head 26 at one end of the screw shank and a helical screw thread 28 on the screw shank. The screw thread 28 has an outer diameter B and a root diameter A and has an upper side 29 and a lower side 30.

As FIGS. 1 through 9 show, nut 20 comprises a nut shank 32, a nut head 34 at one end of the nut shank and engageable with screw head 26 (FIG. 1) and an outwardly expandable shank portion 36. Nut shank 32 includes an integrally formed shank extension 38.

Nut 20 has a screw-receiving bore 40 extending axially therethrough. Bore 40 comprises a first bore portion 42 defined by a cylindrical bore wall 43 of greater diameter than the outer diameter B of screw thread 28 and extending through nut head 34 and through expandable shank portion 36 for slidably receiving screw shank 24 thereinto. Bore 40 further comprises a second bore portion 44 extending through shank extension 38 of nut shank 32 at the insertion end of the nut shank.

Shank extension 38 of nut shank 32 comprises at least two oppositely disposed bore walls 46 and 48 which define oblong second bore portion 44 and which are spaced apart from each other for a distance D1 (FIG. 8) which is greater than the root diameter A but less than the outer diameter B of screw thread 28. Each of bore walls 46 and 48 has a plurality of oblique slots 50 therein for receiving screw thread 28 so that rotation of screw 22, while screw head 26 engages nut head 34, effects axial movement of shank extension 38 at the insertion end of nut shank 32 toward nut head 34 and expansion of expandable shank portion 36 of nut 20 (compare FIGS. 1 and 2).

As FIGS. 1, 2, 4, 5, 6 and 9 show, nut 20 includes screw-guide thread means in the form of a single thread 52 integrally formed on and projecting from bore wall 43 of first bore portion 42 and which is engageable with screw thread 28 of threaded screw shank 24. Thread 52 serves two functions: to hold screw 22 in a pre-assembled condition in nut 20 and to guide screw shank 24 into threaded engagement with the slots 50.

Figure 14:
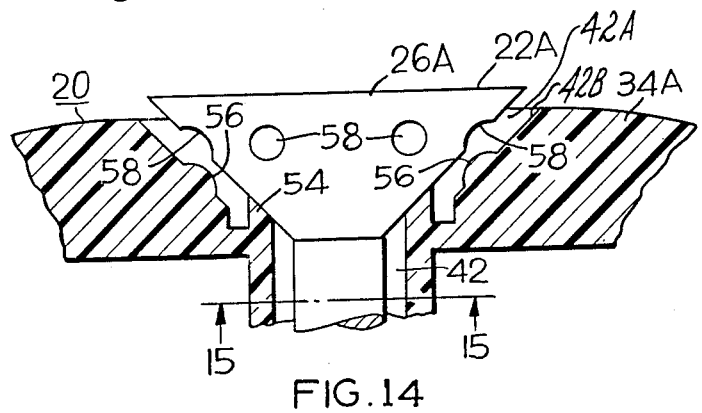
FIG. 14 is an enlarged view, partly in cross-section, of an alternative embodiment of a nut head and a screw head showing locking thereon to prevent screw rotation.
Figure 15:
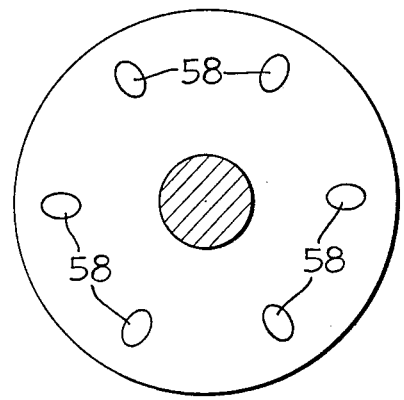
FIG. 15 is a view of the locking means taken on line 15—15 of FIG. 14.

As FIGS. 14 and 15 show, in one embodiment screw-engaging means are provided for inhibiting further screw rotation when screw shank 24 is at a predetermined axial position relative to second bore portion 44 and nut 20 is at or near full expansion. The screw-engaging means comprises screw-support means in the form of an annular projection 54 on nut 20 and surrounding the head end opening of first bore portion 42 and engageable with the head 26A of an alternate form of screw 22A. As FIG. 14 shows, expansion nut 20 comprises a flange means or nut head 34A which has an outer end surface at the head end of the nut shank 32. First bore portion 42 extends axially inwardly from said outer end surface and includes an outwardly diverging conical recess 42A defined by a conical surface 42B. Flange means 34A is provided with engagement means or locking projections 56 on conical surface 42B for engaging corresponding engagement means or detents 58 on head 26A of screw 22A disposed in conical recess 42A. Nut shank 32 is provided with displaceable screw support means 54 disposed around first bore portion 42 near the inwardly diverging end of conical surface 42B which is displaceable by head 26A of screw 22A to enable inter-engagement of the engagement means 56 on conical surface 42B and on head 26A of screw 22A. Projection 54 is movable (i.e., outwardly bendable) in response to predetermined force applied thereto by screw head 26A to a displaced position to enable further rotational and axial advancement of screw 22A. The said screw-engaging means further comprises lock means, including locking projections 56 formed on an alternate form of nut head 34A, which are engageable with detents 58, in head 26A of screw 22A to prevent screw rotation when the screw-support projection 54 is in displaced position. In operation, projection 54, which is resilient or springy, is designed to collapse outwardly when a predetermined clamping load is applied thereto to allow for engagement of the detents 58 and projections 56. Such engagement prevents further undesired tightening of the screw and expansion of the nut and also prevents loosening of the screw due to vibration. The length and width of projection 54 is designed and selected to respond (i.e., deform, bend or collapse) to some predetermined desired load force.

Figure 9:
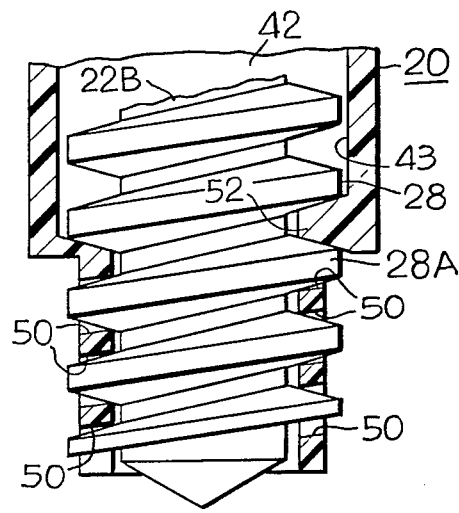
FIG. 9 is a greatly enlarged view, partly in cross-section, of the nut and screw of FIG. 2.
Figure 10:
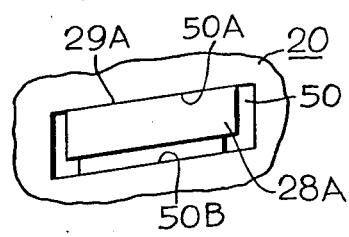
FIGS. 10, 11, 12 and 13 are enlarged side elevation views of several alternative embodiments of the slots shown in FIG. 3.
Figure 11:
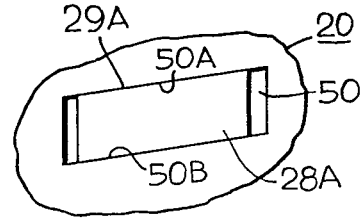

As FIGS. 9, 10 and 11 show, in one embodiment, the thickness of a screw thread 28A increases (proceeding from the insertion end toward the head end of a screw 22B) to create everincreasing frictional engagement of thread 28A with the upper edges 50A of the slots 50 in nut 20. Thus, all contact between the upper side 29A of screw thread 28A is with the upper edge 50A of end slot 50. When screw 22B has been tightened to the design position, the wider thread 28A at the top of screw 22B contacts both upper edge 50A and lower edge 50B of slot 50 to increase friction to thereby resist stripping and to help prevent the screw from loosening. The thread 28A wedges into the slot (compare FIGS. 10 and 11).

Figure 12:
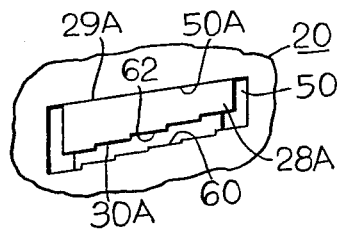

As FIG. 12 shows, in still another embodiment of the invention, ratchet teeth 60 are formed in the lower edge of a slot 50 which engage ratchet teeth 62 formed in the underside 30A of screw thread 28A in screw 22B to provide for maximum stripping resistance as the screw is tightened.

Figure 13:
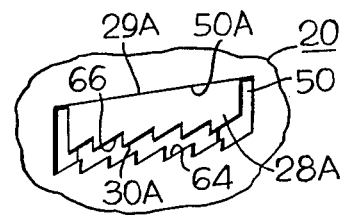

As FIG. 13 shows, in yet another embodiment, ratchet teeth 64 are formed in the lower edges of a slot 50 which engage ratchet teeth 66 formed in the underside 30A of screw thread 28A in screw 22B which interlock to prevent reverse rotation and withdrawal of the screw from the nut.

Figure 16:
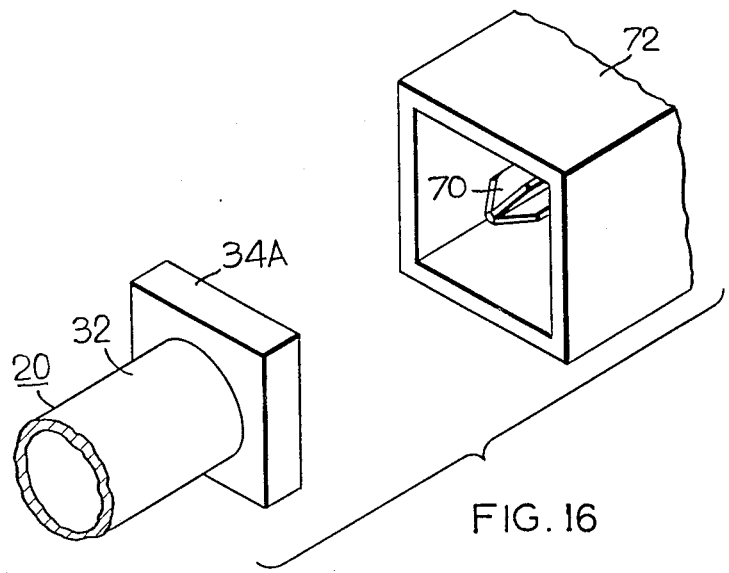
FIG. 16 is a perspective view of a portion of a screw installation tool and a nut modified for use therewith.

Referring to FIG. 16, due to the interference between screw 22 and body 20, the entire fastener 10 will tend to rotate as the screw is rotatably inserted. This can be minimized if nut 22 has a shank 32 of non-circular exterior cross section and the panel holes 16 and 18 have a corresponding shape. To avoid such specialized configurations, and if a power tool having a rotatable screw driven 70 is being used to assemble fastener 10, a special stationary nose piece 72 could be provided on the tool to hold nut 20 against rotation, if the nut 20 is provided a square head 34A.

We claim:

1. A plastic one-piece hollow expansion nut insertable into a panel hole for receiving a screw, said screw having a threaded shank with a screw thread thereon which has upper and lower surfaces and a screw head, said nut comprising:
   a nut shank having a resilient expandable portion therealong;
   and outwardly extending panel-engaging flange means near one end of said nut shank;
   said nut shank being engageable at one end by said screw head and having a screw-receiving bore of predetermined diameter extending axially therethrough, said bore including a first bore portion extending through said expandable portion of said nut shank for receiving said threaded screw shank therein in non-thread engaging relationship, and said bore further including a second bore portion near the other end of said nut shank and defined by bore wall portions which are spaced apart from each other less than said predetermined diameter, said wall portions having axially spaced apart screw thread receiving slots therein for receiving said threaded screw shank in threaded relationship, each slot having an upper edge and a lower edge engageable with a thread surface of said screw thread, and rotation inhibiting means comprising first means on said screw and second means on said nut for engaging said first means on said screw to inhibit further screw rotation when said screw shank is at a predetermined axial position in said second bore portion and said expandable portion of said nut shank has fully expanded to thereby prevent overtorquing of said screw and damage to said nut, said second means comprising screw-support means on said nut engageable with said first means on said screw and movable thereby in response to predetermined force applied thereto to a displaced position to enable further rotational and axial advancement of said screw shank;
   and said rotation inhibiting means further comprising lock means on said nut engageable with said screw to prevent screw rotation when said screw-support means is in said displaced position.

2. A nut according to claim 1 wherein said screw-support means is an annular projection on said nut shank around said screw-receiving bore.

3. A plastic one-piece hollow expansion nut insertable into a panel hole for receiving a screw, said screw having a threaded shank with a screw thread thereon which has upper and lower surfaces and a screw head, said nut comprising:
   a nut shank having a resilient expandable portion therealong;
   and outwardly extending panel-engaging flange means near one end of said nut shank;
   said nut shank being engageable at one end by said screw head and having a screw-receiving bore of predetermined diameter extending axially therethrough, said bore including a first bore portion extending through said expandable portion of said nut shank for receiving said threaded screw shank therein in non-thread engaging relationship, and said bore further including a second bore portion near the other end of said nut shank and defined by bore wall portions which are spaced apart from each other less than said predetermined diameter, said wall portions having axially spaced apart screw thread receiving slots therein for receiving said threaded screw shank in threaded relationship, each slot having an upper edge and a lower edge engageable with a thread surface of said screw thread, and rotation inhibiting means comprising first means on said screw and second means on said nut for engaging said first means on said screw to inhibit further screw rotation when said screw shank is at a predetermined axial position in said second bore portion and said expandable portion of said nut shank has fully expanded to thereby prevent overtorquing of said screw and damage to said nut, said second means comprising at least one slot having its upper and lower slot edges spaced apart a predetermined distance, and said first means comprising a screw thread portion engageable with said one slot and having upper and lower surfaces which are spaced apart a distance which increases in thickness so as to create even-increasing frictional engagement with at least one edge of said slot.

4. An expansion nut according to claim 3 wherein at least one of said thread-engaging slots comprises a bottom edge near said insertion end of said shank which is defined by the associated spaced-apart wall portion of said shank, and wherein said bottom edge comprises at least one screw-engaging tooth for engagement with a corresponding tooth on said lower surface of said screw thread.

5. A fastener (10) comprising a one-piece plastic hollow expansion nut (20) for insertion in an aperature in a work piece having opposite sides and a screw (22) receivable in said nut (20) and operable to effect expansion thereof:

said screw (22) comprising a screw shank (24), a screw head (26) at one end of said screw shank (24) and a helical screw thread (28) on said screw (24), said screw thread (24) having an outer diameter (B) and a root diameter (A) and having an upper side (29) and a lower side (30) defining screw thread thickness;

said nut (20) having a longitudinal axis and comprising a nut shank (32) having a nut shank extension (38), a nut head (34) at one end of said nut shank (32) engageable with one side of said work piece and an outwardly resiliently expandable shank portion (26) engageable, when expanded, with the other side of said work piece, said nut (20) having a screw-receiving bore (40) extending axially therethrough, said bore (40) comprising a first bore portion (42) defined by a bore wall (43) and of greater diameter than said outer diameter (B) of said screw thread (28) and extending through said nut head (34) and through said expandable shank portion (36) for slidably receiving said screw shank (24) thereinto, said bore (40) further comprisng a second bore portion (44) of non-circular cross-sectional configuration extending through said nut shank extension (38);

said nut shank (32) having screw-guide thread means in the form of a single uninterrupted screw-guide thread (52) integrally formed on said bore wall (43) of said first bore portion (42) adjacent said second bore portion (44) and projecting inwardly on all sides of said bore wall (43) toward said longitudinal axis for engagement with said screw thread (28), said screw-guide thread (52) defining an aperture for receiving said screw shank (24) which has a diameter greater than said root diameter (A) of said screw thread (28) but smaller than said outer diameter (B) of said screw thread (28), said nut shank extension (38) comprising at least two oppositely disposed bore wall portions (46, 48) which define said second bore portion (44) and which are spaced apart from each other for a distance greater than said root diameter (A) but less than said outer diameter (B) of said screw thread (28), each of said bore wall portions (46, 48) having at least one slot (50) therein for receiving said screw thread (28) so that rotation of said screw (22), while said screw head (26) engages said nut (20), effects axial movement of said nut shank extension (38) toward said nut head (34) and expansion of said expandable shank portion (36) of said nut (20), each slot (50) having upper and lower edges (50A, 50B) which are spaced apart for a distance which is slightly greater than said screw thread thickness, said screw-guide thread (52) being engageable with said screw thread (28) to hold said screw (22) in pre-assembled condition and to guide said screw thread (24) into threaded engagement with the slots (50).

6. A fastener comprising a one-piece hollow plastic expansion nut insertable into a panel hole and a screw receivable therein to effect expansion thereof:

said screw comprising a screw shank, a screw head at one end of said screw shank and a helical screw thread on said screw shank, said screw thread having an outer diameter and a root diameter and having an upper side and a lower side;

said nut comprising a nut shank having an insertion end, a nut head at one end of said nut shank and having an outer end surface engageable with said screw head and a resilient outwardly expandable shank portion, said nut having a screw-receiving bore extending axially therethrough, said bore comprising a first bore portion of greater diameter than said outer diameter of said screw thread and extending through said nut head and through said expandable shank portion for slidably receiving said screw shank thereinto, said bore further comprising a second bore portion extending through said nut shank near the other end thereof;

said nut shank comprising at least two oppositely disposed bore walls which define said second bore portion and which are spaced apart from each other for a distance greater than said root diameter but less than said outer diameter of said screw thread, each of said bore walls having at least one slot therein for receiving said screw thread so that rotation of said screw, while said screw head engages said nut, effects axial movement of said other end of said nut shank toward said nut head and expansion of said expandable shank portion of said nut, said first bore portion extending axially inwardly from said outer end surface and including an outwardly diverging conical recess defined by a conial surface, said nut head being provided with engagement means on said conical surface for engaging corresponding engagement means on said screw head disposed in said recess, and said shank being provided with displaceable screw support means disposed around said first bore portion near the inwardly diverging end of said conical surface which is displaceable by said screw head to enable inter-engagement of said engagement means on said conical surface and on said head of said screw.

7. A one-piece hollow expansion nut for receiving a screw and comprising:

a nut shank having an expandable portion therealong;

outwardly extending panel-engaging flange means near one end of said nut shank;

said nut shank having a screw-receiving bore extending axially therethrough and including a first bore portion extending through said expandable portion of said nut shank for receiving a threaded screw shank therein in non-thread engaging relationship and a second bore portion near the other end of said nut shank and defined by spaced apart bore wall portions having screw thread receiving slots therein for receiving said threaded screw shank in threaded relationship;

and means for inhibiting screw rotation when said expandable portion of said nut shank has expanded and said screw shank is at a predetermined axial position in said second bore portion, said means for inhibiting comprising screw-support means on said nut engageable with said screw and movable thereby in response to predetermined force applied thereto by said screw to a displaced position to enable further rotational and axial advancement of said screw shank, said screw-support means comprising an annular projection on said nut shank disposed around said screw-receiving bore, said means for inhibiting further comprising lock means on said nut engageable with said screw to prevent screw rotation when said screw-support means is in said displaced position and said screw shank has undergone further rotational and axial advancement.

8. A nut according to claim 6 and means on said screw and on said nut for inhibiting further screw rotation when said screw shank is at a predetermined axial position in said second bore portion and said expandable portion of said nut shank has fully expanded.

* * * * *